United States Patent
Garvey et al.

(10) Patent No.: US 7,111,287 B2
(45) Date of Patent: Sep. 19, 2006

(54) GLOBAL PROCESSOR RESOURCE ASSIGNMENT IN AN ASSEMBLER

(75) Inventors: Joseph F. Garvey, Cary, NC (US); Clark D. Jeffries, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 10/340,499

(22) Filed: Jan. 10, 2003

(65) Prior Publication Data
US 2004/0139427 A1 Jul. 15, 2004

(51) Int. Cl.
*G06F 9/45* (2006.01)
(52) U.S. Cl. ............... 717/144; 717/149; 718/104
(58) Field of Classification Search ............ 717/144, 717/149; 718/104
See application file for complete search history.

(56) References Cited

U.S. PATENT DOCUMENTS

| | | | |
|---|---|---|---|
| 4,782,444 A | | 11/1988 | Munshi et al. |
| 4,965,724 A | * | 10/1990 | Utsumi et al. ............ 717/160 |
| 5,050,088 A | * | 9/1991 | Buckler et al. ............ 700/96 |
| 5,182,807 A | * | 1/1993 | Mizuse et al. ............ 717/122 |
| 5,317,743 A | * | 5/1994 | Imai et al. ................ 717/160 |
| 5,375,239 A | * | 12/1994 | Mortson .................... 717/140 |
| 5,428,810 A | | 6/1995 | Barkans et al. ............ 712/42 |
| 5,446,908 A | | 8/1995 | Kevorkian |
| 5,619,680 A | | 4/1997 | Berkovich et al. ......... 711/173 |
| 5,652,875 A | * | 7/1997 | Taylor ....................... 716/1 |
| 5,758,183 A | | 5/1998 | Scales ........................ 710/5 |
| 5,761,729 A | | 6/1998 | Scales |
| 5,794,016 A | | 8/1998 | Kelleher |
| 5,815,719 A | * | 9/1998 | Goebel ..................... 717/158 |
| 5,854,929 A | | 12/1998 | Van Praet et al. ......... 717/156 |
| 5,907,709 A | * | 5/1999 | Cantey et al. ............. 717/141 |
| 5,909,580 A | * | 6/1999 | Crelier et al. ............. 717/141 |
| 5,933,644 A | | 8/1999 | Wallace .................... 717/156 |
| 5,940,086 A | | 8/1999 | Rentschler et al. |
| 5,960,203 A | * | 9/1999 | Hattori ..................... 717/151 |
| 5,974,257 A | * | 10/1999 | Austin ...................... 717/125 |
| 5,999,734 A | * | 12/1999 | Willis et al. .............. 717/149 |
| 6,009,269 A | * | 12/1999 | Burrows et al. ........... 717/130 |
| 6,061,514 A | * | 5/2000 | Kuno ........................ 717/144 |
| 6,104,962 A | | 8/2000 | Sastry ....................... 700/86 |
| 6,275,986 B1 | * | 8/2001 | Ewart ....................... 717/126 |
| 6,446,257 B1 | * | 9/2002 | Pradhan et al. ............ 717/54 |
| 6,463,582 B1 | * | 10/2002 | Lethin et al. ............. 717/158 |
| 6,542,891 B1 | * | 4/2003 | Loen et al. ................ 707/8 |
| 6,588,008 B1 | * | 7/2003 | Heddes et al. ............ 717/149 |
| 6,631,516 B1 | * | 10/2003 | Baumgart et al. ......... 717/143 |
| 6,636,242 B1 | * | 10/2003 | Bowman-Amuah ....... 715/764 |

(Continued)

OTHER PUBLICATIONS

Borland Turbo Assembler 3.0 User's Guide, 1991, Chapters 13, 14, 15.*

(Continued)

*Primary Examiner*—Todd Ingberg
(74) *Attorney, Agent, or Firm*—Sawyer Law Group LLP

(57) ABSTRACT

An assembler for assembling code is disclosed. The assembly language code includes a plurality of code blocks associated with resource-needs, such as variables, and resources, such as registers, I/O locations, memory locations, and coprocessors. A technology is provided that allows the global assignment of resource-needs to resources such that run time resource conflicts are avoided. A grammar for allowing resources to be defined and managed, a grammar for allowing the resource-needs to be defined and managed, a grammar providing definition of code blocks, and a grammar for associating resources with code blocks are also provided.

15 Claims, 9 Drawing Sheets

U.S. PATENT DOCUMENTS 6,826,752 B1 * 11/2004 Thornley et al. ........... 718/100
6,889,165 B1 * 5/2005 Lind et al. .................. 702/183

OTHER PUBLICATIONS

Compilers Principles, Techniques, and Tools, Alred Aho et al, Sep. 12, 1985, Chapters 1-12.*

Experience with a Software-Defined Machine Architecture, David W. Wall, ACM, 1992, pp. 299-338.*

IBM Technical Disclosure Bulletin, Assembler Macro Implementation, May 1994, 8 pages.*

IBM Technical Disclosure Bulletin, Analysis of Complex Assembler Programs, Nov. 1991, pp. 98-100.*

IBM Technical Disclosure Bulletin, Dec. 1977, 4 pages.*

IBM Technical Disclosure Bulletin, Assembler Compiler Facility for Integrated User Written PreProcessor, Jan. 1974, 2 pages.*

IEEE Standard for Microprocessor Assembler Language, IEEE-Std-694-1985, Jun. 30, 1985, 12 pages.*

Assembley Language Software Development System, Ronnie Yang Kurn Yuen et al, IEEE, 1997, pp. 138-141.*

What Assembly Language Programmers Get Up to Control Flow Challenges in Reverse Compilation, Adrian Johnstone et al, IEEE, May 1988, 16 pages.*

Functional Verification Methodology of Chamelon Processor, Francoise Casaubielth et al, ACM, 1996, 6 pages.*

Specifying Representations of Machine Instructions, Norman Ransey et al, ACM, 1997, pp. 492-524.*

Software Design Methods for Concurrent and Real-Time Systems, by Hassan Gomaa, Chapters 1-3, 11, 14 and 20, published Jul. 9, 1993.*

IEEE Computer Society Press; Israel Symposium on Theory of Computing and Systems; Jun. 10-12, 1996, Jerusalem, Israel; "On Chromatic Sums and Distributed Resource Allocation" Amotz Bar-Noy, Hadas Shachnai, Tami Tamir.

* cited by examiner

215

1C ——

```
;Routine to total up all values in ChangeValue location. ErrReg points
;to error handler.
;Total returned in location indicated by ClpArray0.

extern subroutine IPv6Error, IPv4Error
MemBlock ChangeValue              ;Value changes after each read
AddMemResource ClpArray0          ;Never used scratch mem location
HalfWordReg ErrReg                ;Routine to handle errors FooBar1 subroutine {

AddRegResource r0, r30, r31   ;These registers can always
                                  ; be overwritten (by policy)
    WordReg MyVar1                ;local variables
    WordReg TotalVar ldr MyVar1,#10
    while ( MyVar1 > #0 )
    {
        WordReg TmpVar            ;TmpVar exists only inside of loop
        ldr TmpVar,ChangeValue    ; context
        add TotalVar,TmpVar
        sub MyVar1,#1
    }
    endwhile ;Check total value, if too large, error out.

if ( TotalVar > #0xFF )
        PDL ErrReg = ( IPv6Error, IPv4Error )   ;possible error handlers
        jmp ErrReg
    endif PDL [ClpArray0] = (0x1234, 0x4444:0x4450)   ;possible locations
    ldr [ClpArray0],TotalVar         ;return total rtn
}
```

Figure 5

GLOBAL PROCESSOR RESOURCE ASSIGNMENT IN AN ASSEMBLER

FIELD OF THE INVENTION

The present invention relates to computer systems, and more particularly to a method and system for globally assigning processor resources by an assembler.

BACKGROUND OF THE INVENTION

Assembly language code is used in a variety of applications. In order to generate an executable image from assembly language code, a conventional assembler is typically used. FIG. 1 depicts a conventional assembler 10. The conventional assembler 10 includes a parser/lexer 12 for reading in assembly language code and a code generator 14 for generating the executable image. Assembler 10 sequentially invokes parser/lexer 12 followed by code generator 14.

FIG. 2 is a high-level flow chart depicting a conventional method 50 for generating an executable image from assembly language code using the conventional assembler 10. Resources to meet needs within the code are manually assigned by the programmer, via step 52. The assembly language code is then assembled by 10, via step 54. An executable image is thus provided. The executable image from step 54 is analyzed for problems including resource conflicts, via step 56. If resource conflicts do exist, then step 58 forces another manual assignment of resources in step 52. The cycle of steps 52, 54, 56 and 58 continues until no resource conflicts or other defects are found, thus realizing the final executable image.

One of ordinary skill in the art will readily recognize that the method 50 may be time-consuming and relatively difficult to implement. In particular, the programmer must manage the resources to be used by the code manually, and debug resource conflicts in the executable image's run time environment. The most common solution to this problem is to move to a higher-level programming language such as 'C' or 'BASIC'. However, the programmer must surrender the detailed control provided by assembly language to gain the resource management provided by a higher-level language.

For those programmers unwilling to sacrifice the detailed control of the processor provided by assembly language programming, what is needed is a system and method for integrating processor resource management into assembly language. The present invention addresses such a need.

SUMMARY OF THE INVENTION

The present invention provides a method and system for assembling code using an assembler. The assembly language code identifies a plurality of code blocks that are associated with a plurality of resource-needs and a plurality of resources. The method and system comprise a technology which allows the plurality of resource-needs to be paired with members of the plurality of resources for each code block as to avoid run time resource conflicts in the executable image. The method and system further comprise a grammar for allowing the plurality of resources to be defined and managed, a grammar for allowing the plurality of resource-needs to be defined and managed, a grammar providing definition of code blocks, and a grammar for associating the plurality of resources and the plurality of resource-needs with the code blocks. The method and system further comprise a means to automatically pair members of the plurality of resource-needs with the plurality of resources in such a fashion that run time resource conflicts in the executable image are avoided.

According to the system and method disclosed herein, the present invention provides a method and system for automatically assigning resources to resource-needs using an assembler. In addition, the method and system may also gracefully fail if the resources cannot be assigned, indicating a portion of the code that may be fixed. Consequently, assembly of code is simplified by automatically analysis and allocation of resources, and resolving resource management issues at build time.

BRIEF DESCRIPTION OF THE DRAWINGS

FIG. 5 is an exemplary piece of code for which resource assignment is to be performed.

DETAILED DESCRIPTION OF THE INVENTION

Figure 1:
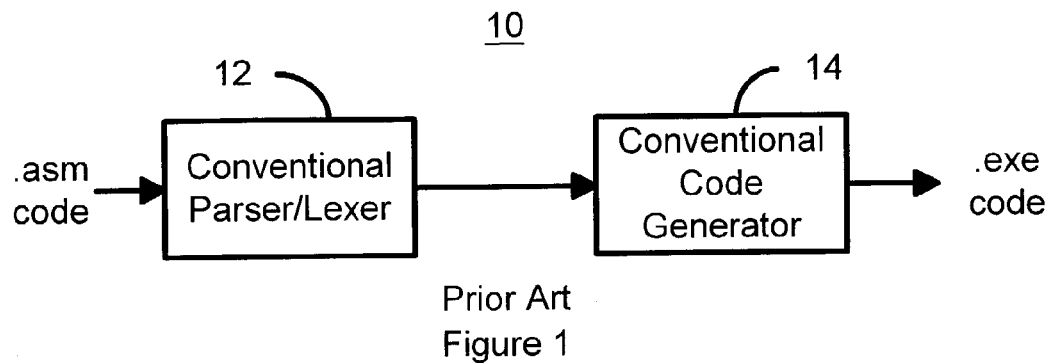
FIG. 1 is a diagram of a conventional assembler.
Figure 2:
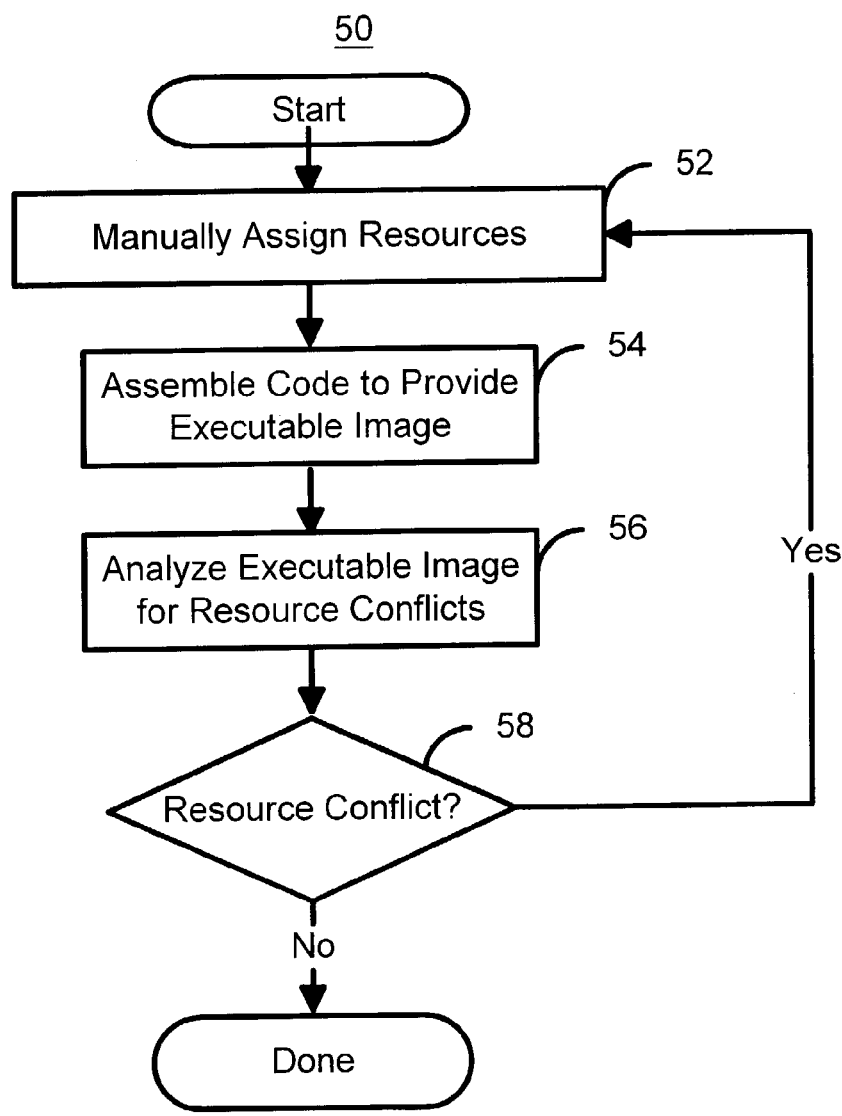
FIG. 2 is a flow chart depicting a conventional method for assigning resources using a conventional assembler.

The present invention relates to an improvement in assembly language and assemblers for computer systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for performing resource assignment in assembly language code using an assembler. The assembly language code includes a plurality of code blocks that are associated with a plurality of resource-needs, and a plurality of resources. The method and system together provide a grammar to define code blocks, and to provide a map of the relationships between code blocks, and to associate a plurality of resources and a plurality of resource-needs with each code block. The method and system also automatically assigns at least a portion of the plurality of resources to members of the plurality of resource-needs based upon the code block associations.

The present invention will be described in terms of particular resources, resource-needs, and code blocks. However, one of ordinary skill in the art will readily recognize that this method and system will operate effectively for other and/or additional resources used by the code being assembled, other, more complex code blocks and other code generating tools. For example, much of the present invention is described in the context of register assignment. However, the present invention is fully applicable to assignment of other resources such as, but not limited to, I/O locations, memory locations, and control of coprocessors.

More specifically, consider the most significant assembly language resource management problem, register assignment. Using the method and system described herein can provide the ability to:

1) Group code into contexts in a fashion similar to a high level language, and associate a context info structure with each context.
2) Provide for the creation of assembly language resource-needs/variables and record the association between the context and the resource-need/variable in the proper context info structure.
3) Recognize and record the usage of resource-needs/variables with the context in the proper context info structure.
4) Recognize possible assembly language control flow changes to other contexts such as subroutine calls and jumps. Record the linkage due to the control flow change in the initial and final context info structures.
5) Recognize and record the usage of resources/registers within the context in the proper context info structure.
6) Provide for the incremental or complete specification of what resources/registers are available within the context in the context info structure.
7) Assign processor resources/registers to assembly language resource-needs/variables in such a fashion that two or more contexts are not using the same resource/register for different resource-needs/variables at the same time, or fail to assign resources/registers in such a fashion that the fewest resource-needs/variables remain unassigned, and report these unassigned resource-needs/variables.

Figure 3:
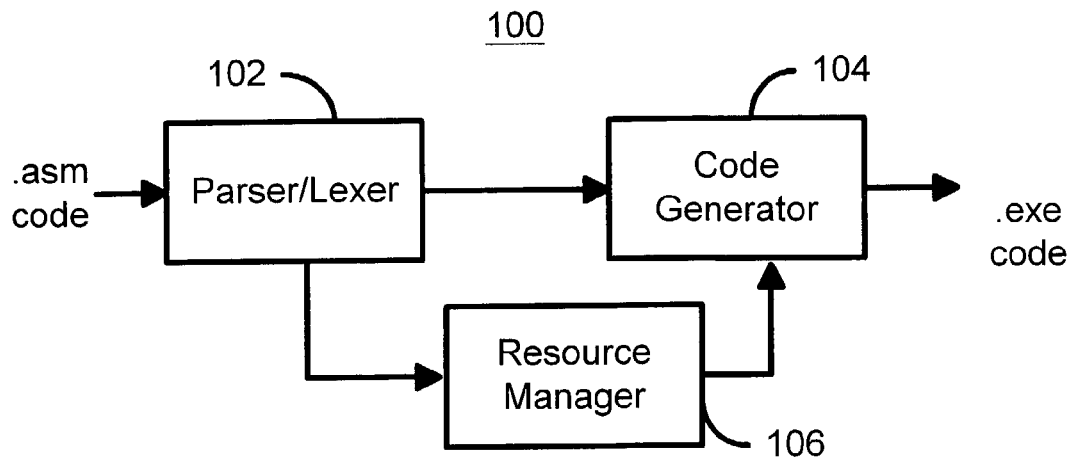
FIG. 3 is a block diagram depicting one embodiment of an assembler in accordance with the present invention that can automatically assign resources.

To more particularly illustrate the method and system in accordance with the present invention, refer now to FIG. 3, depicting one embodiment of an assembler 100 that can automatically assign resources/registers for code being assembled. The assembler 100 includes a parser/lexer 102, a code generator 104 and a resource manager 106. The parser/lexer 102 processes the assembly language code input to the assembler 100. The parser/lexer 102 supplies necessary information to the code generator 104 and the resource manager 106. Next, the resource manager 106 automatically assigns a resource/register for each resource-need/variable found by the parser/lexer 102 to the maximum extent possible. If the assignment fails, the resource manager 106 reports the fewest unassigned resource-needs/variables to the programmer. Assuming a successful assignment of resources/registers to resource-needs/variables, the resource/register to resource-need/variable pairing information is forwarded to the code generator 104 so that executable image creation can occur in a conventional fashion.

Figure 4:
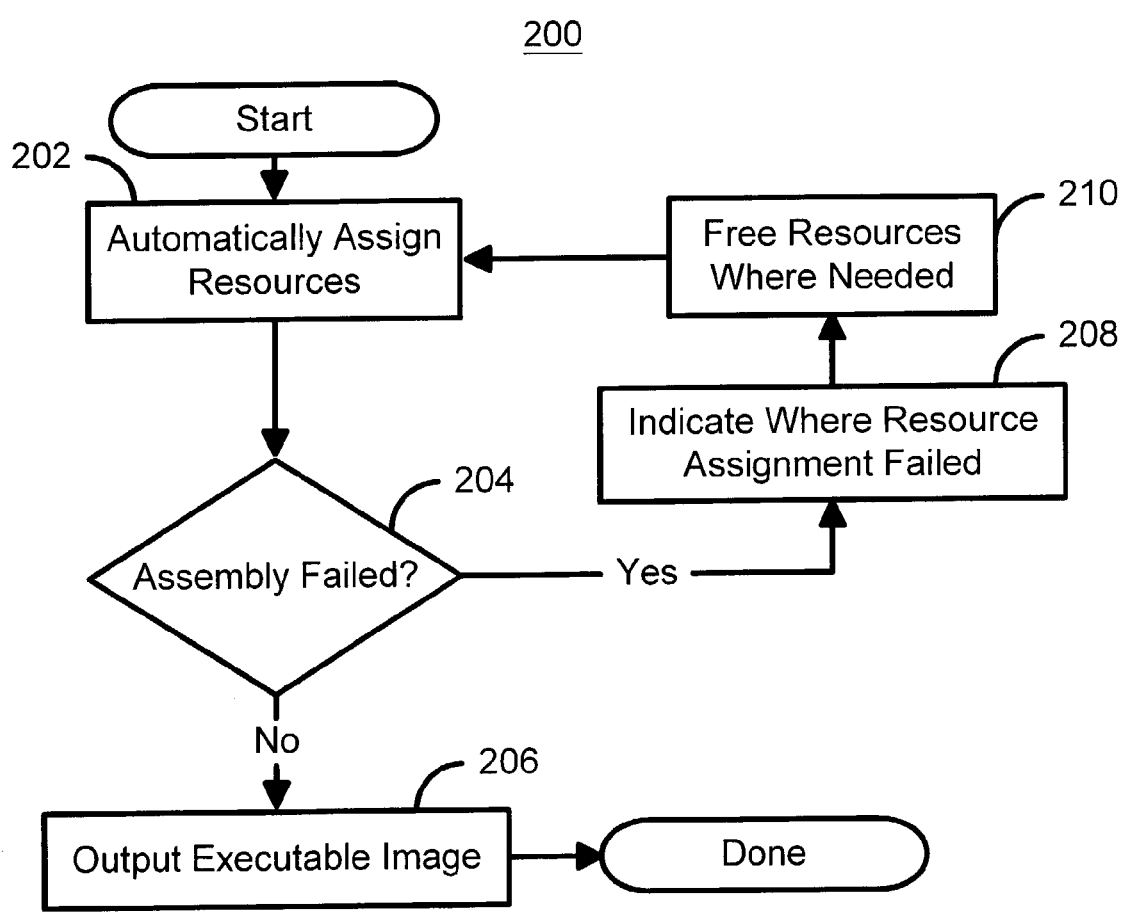
FIG. 4 is a flow chart depicting one embodiment of the method for assigning resources using an assembler in accordance with the present invention.

FIG. 4 is a flow chart depicting the method 200 for generating an executable image from assembly language code using an embodiment of an assembler 100 in accordance with the present invention for allowing resources to be automatically assigned. In operation, the assembler 100 runs and attempts assignment of resources/registers, via step 202. Step 202 attempts to automatically pair resources/registers with the resource-needs/variables such that no two contexts exist simultaneously at run time using the same resource/register. If it is possible to assign resources/registers to all resource-needs/variables without creating a run time resource/register conflict in the executable image then assembler 100 determines that assembly has succeeded, via step 204. Thus, an executable image is generated, via step 206. If it is determined in step 204 a resource/register conflict occurs and, therefore, that assembly has failed, then assembler 100 indicates the unassigned resource-needs/variables and each unassigned resource-need's associated context via step 208. The programmer can then free the resources/registers needed, via step 210. Notice that step 210 is an incremental step, and not a global reassignment of resources as was required in step 52, thus requiring much less effort on the assembly language programmer's part. Resource Manager 106 performs step 208 in such a way that the unassigned resource-needs are easily met by having the programmer free a resource/register in the context where the assignment failed 210. This allows steps 202, 204, 208 and 210 to be repeated until the assembly can be completed without error. As can now be seen, the programmer need not reassign all of the resources used by the code. Instead, the programmer faces a more limited problem relating to freeing resources that could not be assigned automatically. This results in the automation of steps 52, 54, and 56, thereby significantly reducing the programming effort required to program in assembly language.

In order for parser and lexer 102 to implement the method and system in accordance with the present invention, the conventional assembler is modified. In general, these modifications allow the parser and lexer 102 to recognize contexts, to declare and recognize resource-needs/variables and to declare and recognize resources/registers. These modifications include:

1) Add recognition of contexts. Typically this is done by adding grammar, such as the 'C' programming language's use of '{' and '}'.
2) Add directives to declare resource-needs/variables, and update internal assembler context info structures to record these resource-needs/variables.
3) Add recognition of resource-need/variable usage in opcode directives, including modifying opcode structures to record the resource-need/variable or resource-needs/variables in question.
4) Add directives to declare resources/registers, and update internal assembler context info structures to record availability of these resources/registers.
5) Add recognition of resource/register usage in opcode directives, and update internal assembler context info structures to record usage of these resources/registers.
6) Add program definition language (PDL) directives to inform the assembler of ambiguous run time determined control flow changes, and update context info structures to record all possible control flow changes to other contexts.
7) Add PDL directives to prefix ambiguous run time determination of resource/register accesses, and update internal assembler context info structures to record usage of these resources/registers.

FIG. 5 depicts an exemplary piece of code 215 illustrating a use of one embodiment of the method and system in accordance with the present invention. In exemplary code 215, a nested set of contexts can be seen. The file context 1C holds the subroutine context 1A, which in turn holds the while-loop context 1B. The grammar for managing contexts can be integrated with the language of the assembler as in the case of the subroutine context 1A, or the context management grammar can be separate from the basic assembler grammar as indicated by context 1B which is in turn delimited by the while and endwhile directives.

Exemplary code 215 also illustrates resource-need/variable management. In context 1B resource-need/variable 2A (TmpVar) is defined. Similarly resource-needs/variables 2B (MyVar1 and TotalVar) are defined in context 1A. Because all the resource-needs/variables of 2A and 2B are active in context 1B, separate registers will be required for each variable. It is also possible to have resource-need/variables in the file context 1C as illustrated by 2C (ErrReg).

Exemplary code 215 also illustrates resource/register management. Like resource-need/variable management, resource/register management is also be done on a context-by-context basis. In context 1C, the file context, a non-register resource (memory) is made available in 4A (ClpArray0). Resource 4A will be available to all contexts in the file context 1C. In context 1A, three registers are added to the list of available resources via 4B.

The assembler 100 also recognizes the usage of resource-needs/registers in exemplary code 215. In context 1B, resource-need/variables from the same context (TmpVar), and from outside the current context (ChangeValue and MyVar1) are used in 3A. Similarly, it is possible for the programmer to make direct usage of a resource. This is illustrated in 5A, where memory resource ClpArray0 is used.

Since most microprocessors support run time determination of branching, an assembler grammar has to be supplied to resolve ambiguities and indicate to the assembler potential connections between contexts. In 6A, the variable ErrReg is used to do a run time branch. The previous PDL directive informs assembler 100 that ErrReg can go to either of the code locations indicated by IPv6Error or IPv4Error. In a similar fashion, it is also possible for most microprocessors to do indirect memory accesses. In 7A, the location of memory being accessed is ambiguous. This ambiguity is resolved in the preceding PDL directive by indicating that the ambiguous memory location is 0x1234 or in the range of location 0x4444 thru 0x4450.

After parser/lexer 102 have completed processing of the assembly language code, the resource manager 106 will have a set of context info structures. The context info structures indicate the resource-needs/variables for the context and the resources/registers used in the context, and the possible control flow changes between contexts.

Resource manager 106 implements a resource management algorithm that pairs resources/registers with resource-needs/variables. The resource manager 106 pairs members of the resources/registers with resource-needs/variables such that no two simultaneously active contexts use the same resource/registers for a different resource-need/variable. In the event that all of the resource-needs/variables cannot be met by existing resources/registers without creating conflicts, the resource manager 106 indicates to the programmer the resource-needs/variables for which resources/registers are not assigned. The result of this assignment is then passed to code generator 104, where the resource-needs/variables are replaced by resources/registers.

The algorithm implemented by resource manager 106 has several important properties. The resource manager 106 attempts to:

1) minimize usage of resources; and
2) assign resources to the resource-needs that are most frequently active first; and
3) detect when automatic assignment of a resource fails, and report on the resource-needs for which resources have not been assigned.

Figure 6:
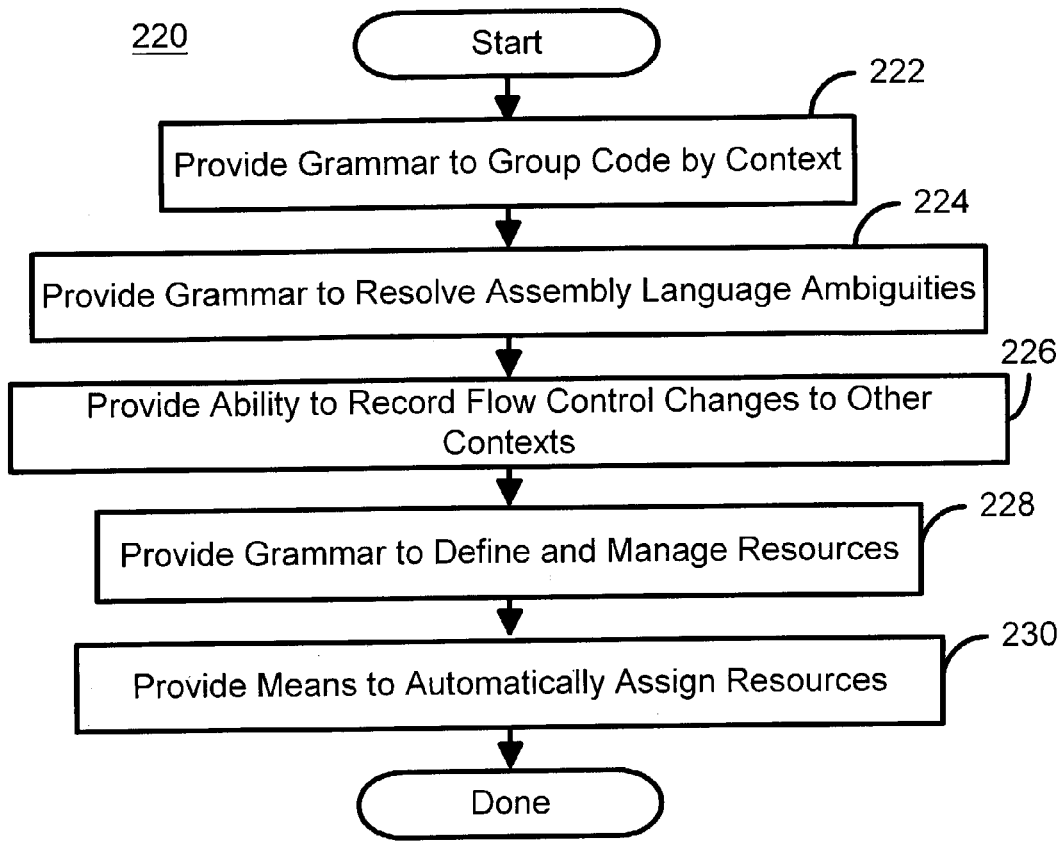
FIG. 6 is a flow chart of one embodiment of a method for providing the modifications used in converting a conventional assembler to an assembler capable of automatically assigning resources.

FIG. 6 depicts a high-level flow chart of one embodiment of a method 220 for converting assembler 10 into the assembler 100. A grammar is provided that allows code blocks to be grouped by context, via step 222. Thus, the grammar provided in step 222 allows a context to be defined for the code blocks. The grammar provided in step 222 also preferably allows resource-needs/variables associated with the context to be defined. A grammar, provided via step 224, also preferably allows ambiguities in usage of indirect resources/registers or usage of indirect resource-needs/variables within the context to be resolved and allows for ambiguities in indirect control flow changes within the context. The ability to record control flow changes to other contexts is provided, via step 226. A grammar that allows resources to be defined and managed is provided, via step 228. Thus, a programmer can make use of the grammar provided in steps 222, 224, 226 and 228 to exploit the functions of the parser and lexer. A means to automatically assign resources is provided, via step 230. Thus, step 230 provides the resource manager 106.

Figure 7:
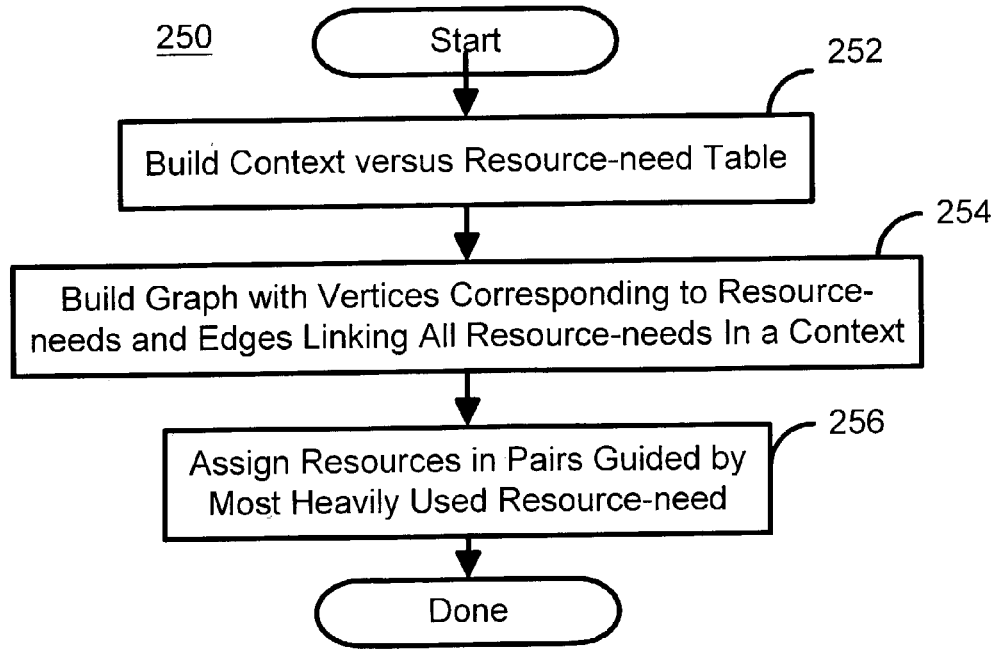
FIG. 7 is a high level flow chart of one embodiment of a method in accordance with the present invention for automatically assigning resources in an assembler.

FIG. 7 is a flow chart of a preferred embodiment of a method 250 in accordance with the present invention for assigning resources/registers using an assembler such as the assembler 100. The method 250 is also preferably implemented using the resource manager 106. A resource/register assignment is performed by first constructing a table with the rows corresponding to each possible context, and columns corresponding to all possible resource-needs/variables in step 252. This table is populated by examining each context info structure, created by the parser/lexer 102, and marking an entry for each resource-need/variable that is active while the context is active. To do this it will be necessary to use the context change information record in the context info structure to locate other contexts that are simultaneously active and add their resource-needs/variables to the current context's/row's entries. One additional row is added at the bottom of the table. This row contains a count of the marks in each column. This count is the number of times a resource-need/variable is active.

Next, in step 254, the table is converted to a graph (making use of concepts from the graph theory branch of mathematics). Each vertex in the graph corresponds to a resource-need/variable, and is graphically depicted by a circle. Each vertex is connected by an edge, which is graphically depicted by a line connecting two vertices. An edge in the graph is created by connecting a pair of resource-needs/variables that are active in a context. Edges are created for all possible pairings of unique resource-needs/variables in a context. Stated another way edges are created between unique marks in a row of the table.

Next, in step 256, the graph is used to assign resources/registers such that no adjacent vertices with a connecting edge are assigned the same resource/register. In the preferred embodiment of this invention, resource assignment is done with a specially designed variation of a Red-Black graph cutting algorithm. In this cutting algorithm, a pair of resources/registers are assigned to resource-needs/variables in a fashion designed to mimic the assignments a programmer would typically make (most frequently used resource-needs/variables assigned first), and to disconnect the maximum number of edges in the graph. The effect of this cutting algorithm is to break the graph down into smaller and separate graphs as each pair of resources/registers is applied. This has the effect of minimizing the number of resources/registers required, because each separate graph can use the same resource/register pair.

Figure 8:
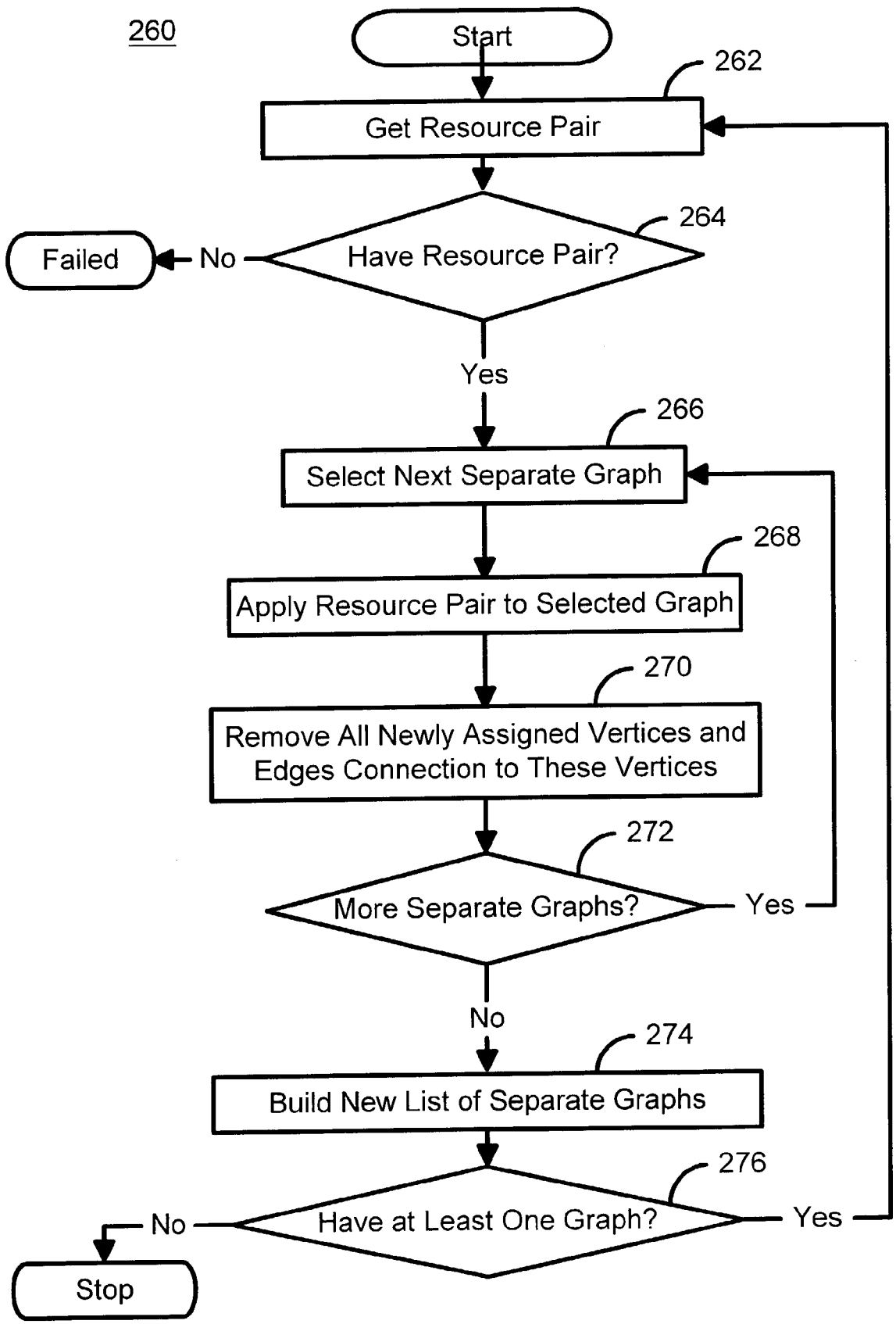
FIG. 8 is a more detailed flow chart of a preferred embodiment of a method in accordance with the present invention for assigning resources using an assembler.

FIG. 8 is a flow chart depicting one embodiment of a method 260 in accordance with the present invention for assigning resources/registers to resource-needs/variables. The method 260 is preferably used to perform step 256 of method 250 depicted in FIG. 7. The method 260 is also preferably implemented using the resource manager 106. Referring back to FIG. 8, resources/registers are assigned in pairs to the original graph from step 254. Method 260 can break the original graph into separate graphs (graphs not sharing any edges). The first step 262 is to select a previously unused pair of resources/registers. Step 264 determines if the algorithm has failed, because there are no more resources/registers. If this is indeed the case, then step 264 stops the assignment so the error can be reported via step 208 of the method 200 depicted in FIG. 4. Otherwise, in step 266, assignment continues by selecting any separate graph from the set of possible separate graphs without replacement. Initially there will be only one graph. The method, in step 268, applies the selected resource/register pair to the selected graph. Step 268 exhausts the use of the selected resource/register pair for the selected graph. Step 270 removes all vertices where the selected resource/register pair was assigned to resource-needs/variables. All edges to the removed vertices are also removed in step 270. The end result of this is often the splitting of the selected graph into sub-graphs. However, the method 260 doesn't see these as separate graphs until step 274. However, a previous pass through method 260 may have left separate graphs. If the selected resource/register pair has not been applied to a sub-graph that existed when the resource/register pair was selected, then step 272 moves to step 266 to process the unprocessed graph. This continues until all sub-graphs have been processed with the selected resource/register pair. Once all sub-graphs have been processed, step 274 is used to examine the remaining vertices and identify a new set of graphs for processing. If step 274 found any graphs to work with, step 276 starts method 260 over on the remaining graphs with the remaining resources/registers. If there are no further graphs, then method 260 has successfully assigned all resource-needs/variables to resources/registers.

Figure 9:
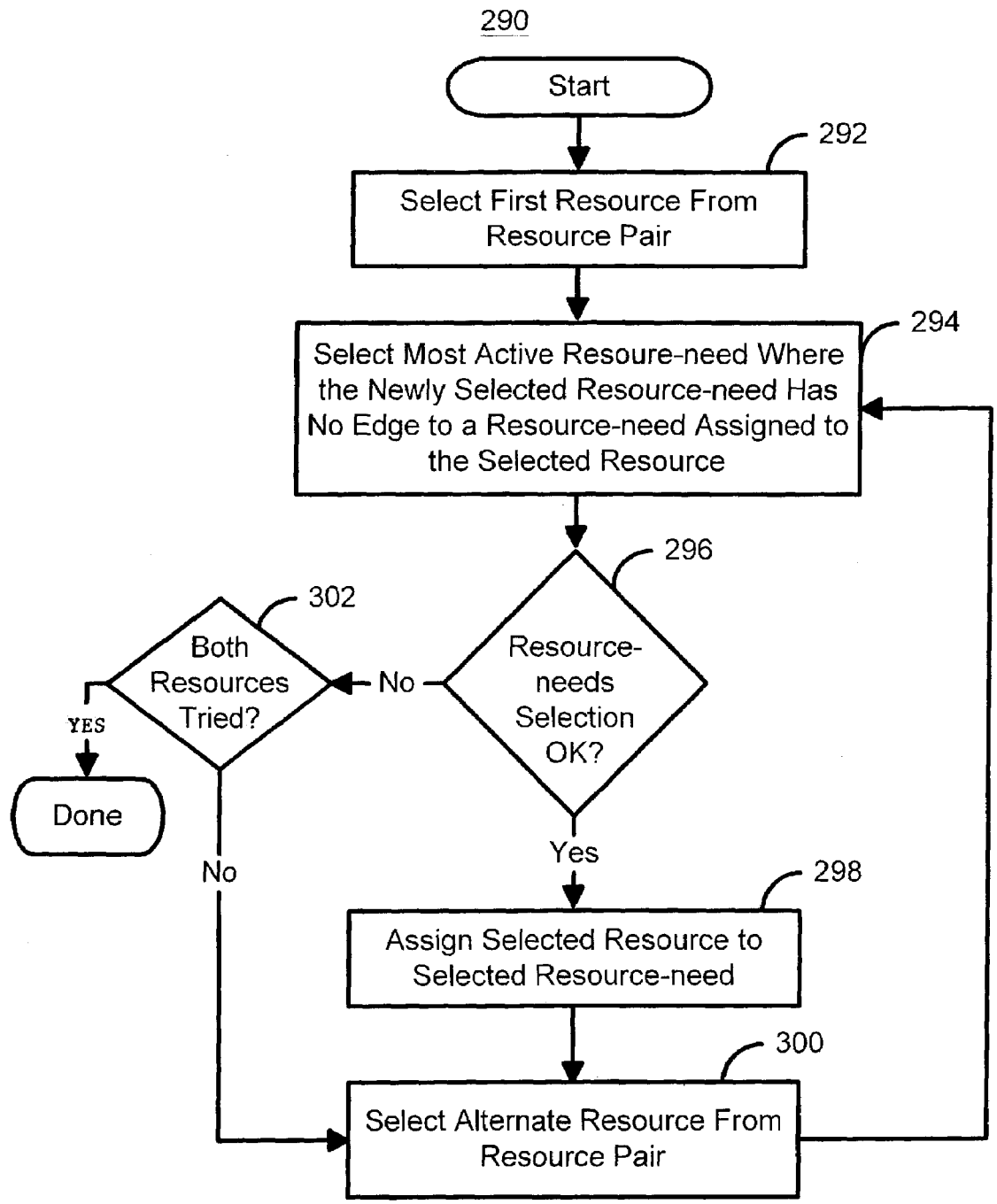
FIG. 9 is a flow chart depicting one embodiment of a method in accordance with the present invention for assigning a single pair of resources in a single graph.

FIG. 9 is a method 290 for implementing step 268. A selected resource/register pair will be applied to a single graph. To start, step 292 selects one resource/register from the selected resource register/pair. The choice is entirely arbitrary. Step 294 attempts to locate a single resource-need/variable/vertex to assign the selected resource/register to. Step 296 checks to see if a candidate vertex/resource-need/variable was found by step 294, if not, then a second check 302 is performed to make sure the vertex/resource-need/variable search occurred for both resources/registers of the resource/register pair. If no candidate vertex/resource-need/variable is found for both resource/registers in the resource/register pair, the assignments in method 290 are complete. A candidate vertex/resource-need/variable that meets all the requirements becomes the new selected vertex/resource-need/variable. Step 298 assigns the newly selected vertex/resource-need/variable to the selected resource. Step 300 changes the selected resource to the other resource in the selected pair, and method 290 repeats starting with step 294.

Figure 10A:
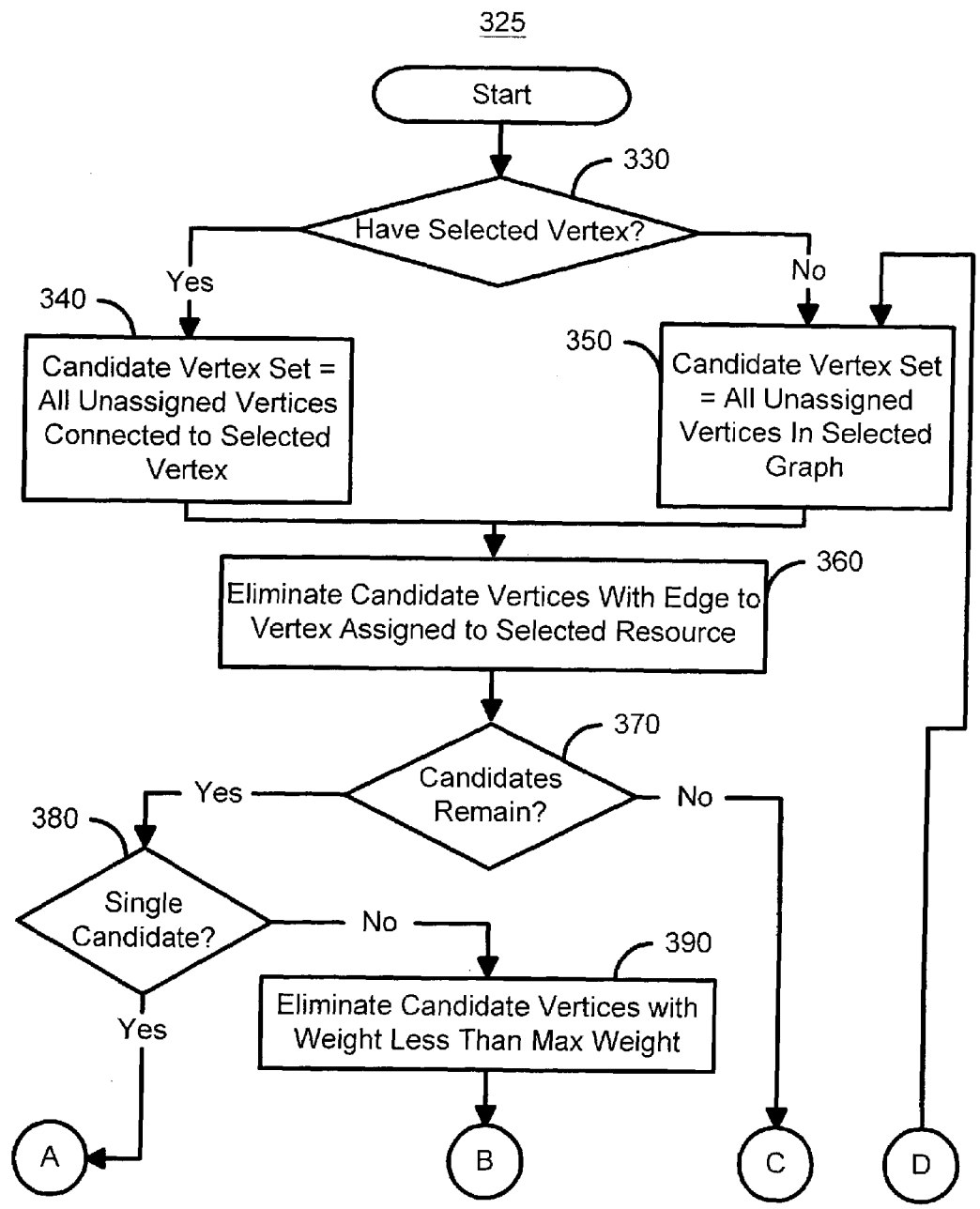
FIGS. 10A and 10B depict a flow chart for one embodiment of a method in accordance with the present invention for identifying a single vertex for assignment in a single graph.
Figure 10B:
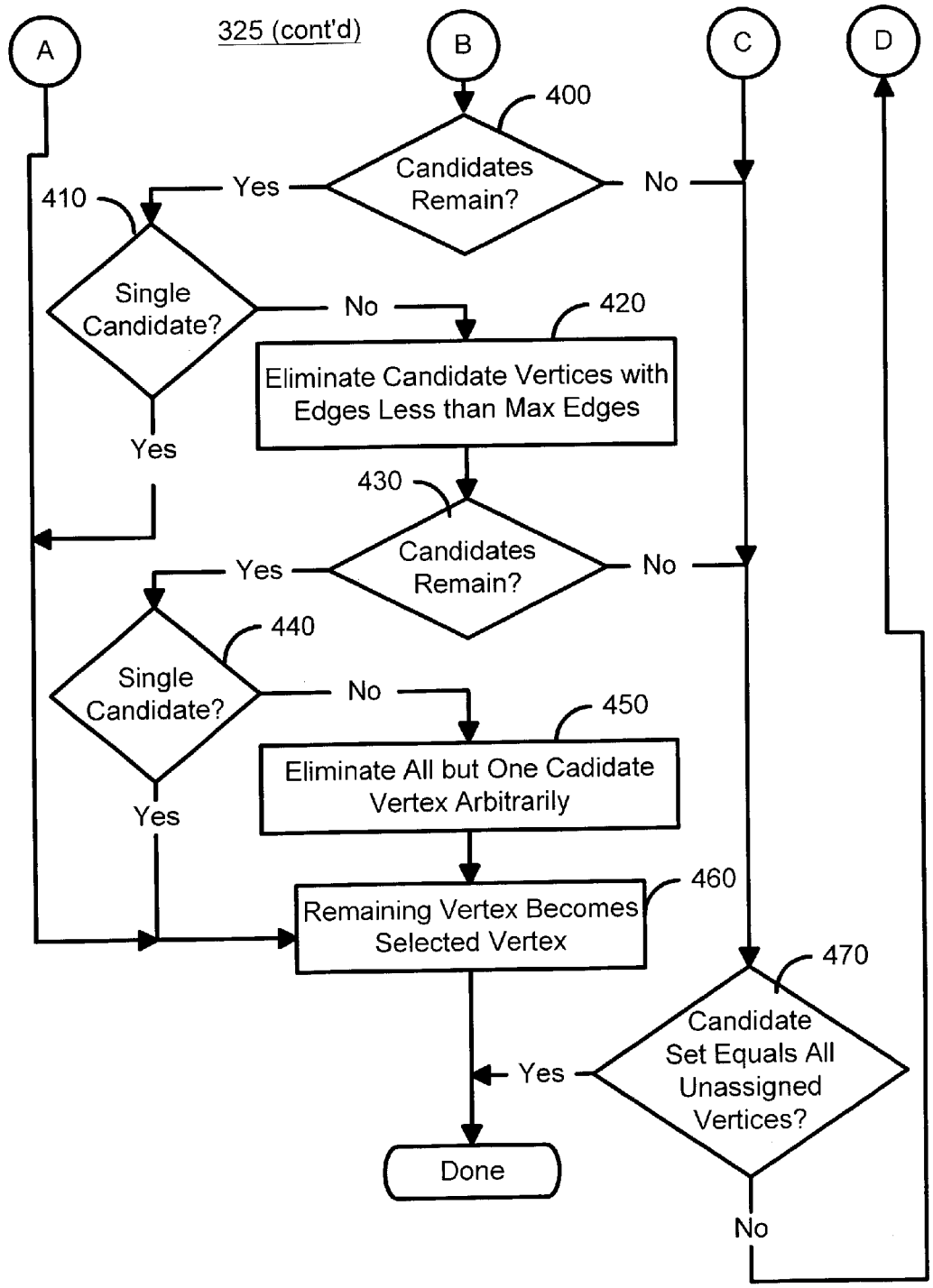

FIGS. 10A and 10B depict one embodiment of a method 325 for implementing step 294. Method 325 is the preferred embodiment of the method used to select a single vertex/resource-need/variable for assignment to the selected resource. The method 325 is best understood as the core of the graph cutting algorithm, and as such is best described using graph theory terminology. The first time method 325 is performed, there will be no previously selected vertex. However, normally there will be a previously selected vertex. Step 330 causes an initial set of candidate vertices to be selected based on presence of a previously selected vertex. In step 340, the candidate set of vertices to consider is set to all unassigned vertices connected by an edge to the previously selected vertex. In step 350, the candidate set of vertices is set to all previously unassigned vertices in the selected graph. In step 360, all candidate vertices that have an edge to a vertex previously assigned to the selected resource are eliminated from the candidate set. It is possible that this eliminates all candidate vertices. Step 370 detects this occurrence. If there are no more candidate vertices, step 470 attempts to restart method 325 if step 470 occurred because no suitable vertex connected to the previously selected vertex existed. This amounts to restarting the cutting algorithm at a new location in the selected graph when the existing cut cannot be continued. If step 470 cannot continue, then method 325 is complete, and there is no next selected vertex. When candidate vertices remain at step 370, step 380 is used to check if the algorithm is complete, because only one candidate vertex remains. If multiple candidate vertices remain, step 390 eliminates from the candidate set all vertices that don't have the maximum weight in the candidate set (most frequent use). Step 400, like step 370, causes method 325 to attempt a restart if all candidate vertices have been eliminated. Step 410, like step 380, causes method 325 to move to the end if we've found a single candidate vertex. Assuming multiple candidate vertices remain, step 420 eliminates from the candidate set all candidate vertices with less than the maximum number of edges in the candidate set. Step 420 assures that the candidate vertex that eliminates the maximum number of edges from the graph is selected. Step 430, like steps 370 and 400 handle the possibility that all candidate vertices have been eliminated. Similarly, step 440, like steps 380 and 410 handles the possibility that a single vertex has been located. Assuming multiple candidate vertices remain, step 450 causes a single vertex to be arbitrarily selected from the candidate vertices. Step 460 promotes the single remaining candidate vertex to the become the new selected vertex/resource-need/variable.

To illustrate methods 250, 260, 290, and 325 consider the following example. Suppose there are nine different unique resource-needs/variable {Need0, Need1, Need2, Need3, Need4, Need5, Need6, Need7, Need8} and seven contexts {CtxtA, CtxtB, CtxtC, CtxtD, CtxtE, CtxtF, CtxtG}. In addition, suppose that the resource-needs/variables contained in the contexts are as follows:

|  | Need0 | Need1 | Need2 | Need3 | Need4 | Need5 | Need6 | Need7 | Need8 |
|---|---|---|---|---|---|---|---|---|---|
| CtxtA | X | X |  |  |  |  |  |  |  |
| CtxtB |  |  | X | X |  |  |  |  |  |
| CtxtC |  |  |  |  | X | X | X |  |  |

-continued

|       | Need0 | Need1 | Need2 | Need3 | Need4 | Need5 | Need6 | Need7 | Need8 |
|-------|-------|-------|-------|-------|-------|-------|-------|-------|-------|
| CtxtD |       |       |       |       |       | X     | X     | X     |       |
| CtxtE |       | X     |       |       |       |       |       |       | X     |
| CtxtF |       |       | X     |       |       |       |       | X     | X     |
| CtxtG | X     |       | X     |       | X     |       | X     |       |       |
| Weight| 2     | 1     | 2     | 3     | 2     | 2     | 3     | 2     | 2     |

Figure 11A:
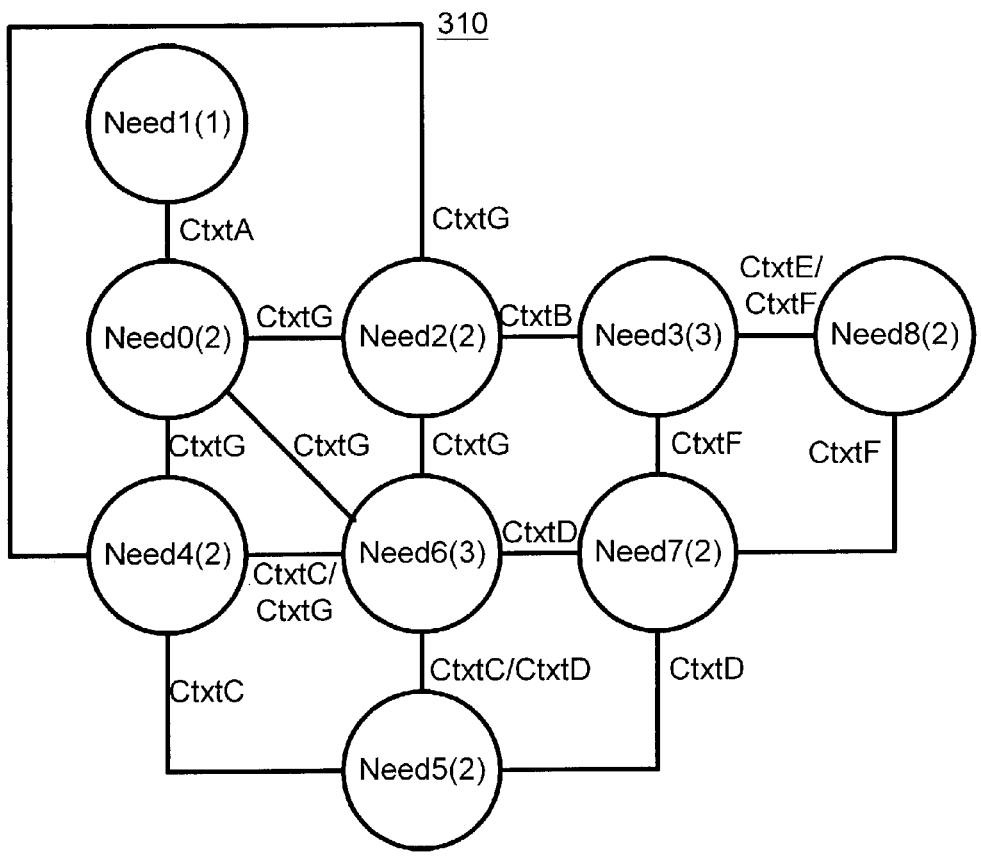
FIGS. 11A–11B depict graphs resulting from the example assignment of resource-needs to resources-needs in accordance with the present invention.
Figure 11B:
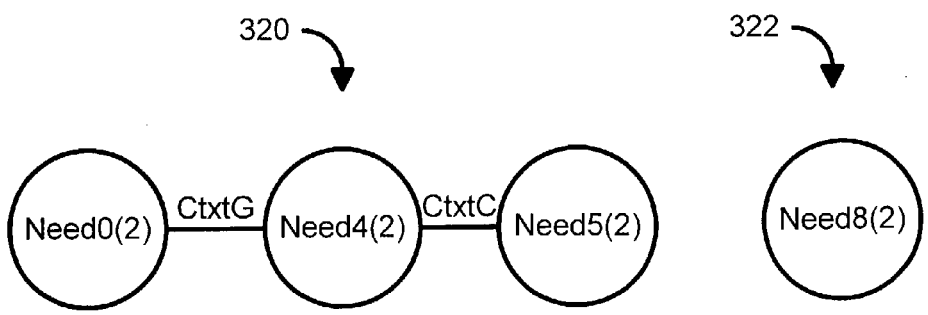

FIG. 11A depicts the resulting graph 310, from processing the above table by step 254.

Applying the first resource/register pair occurs as follows (minor steps skipped):

1. Step 262: Selected resource/register pair is {R0, R1}.
2. Step 266: Selected graph is 310.
3. Step 292: Selected resource/register from resource/register pair is R0.
4. Step 350: Candidate vertex set is {Need0(2), Need1(1), Need2(2), Need3(3), Need4(2), Need5(2), Need6(3), Need7(2), Need8(2)}.
5. Step 360: Candidate vertex set is unchanged.
6. Step 390: Maximum weight of candidate vertices is 3. Candidate vertex set is {Need3(3), Need6(3)}.
7. Step 420: Maximum number of edges for candidate vertices is 5. Candidate vertex set is {Need6(3)}.
8. Step 460: Need6(3) is the new selected vertex.
9. Step 298: Need6(3) is assigned selected resource/register R0.
10. Step 300: Selected resource/register is R1.
11. Step 340: Candidate vertex set is {Need0(2), Need2(2), Need4(2), Need5(2), Need7(2)}.
12. Step 360: Candidate vertex set is unchanged.
13. Step 390: Maximum weight of candidate vertices is 3. Candidate vertex set is unchanged.
14. Step 420: Maximum number of edges for candidate vertices is 4. Candidate vertex set is {Need0(2), Need2(2), Need4(2)}.
15. Step 450: Candidate vertex set is arbitrarily set to {Need2(2)}.
16. Step 460: Need2(2) is the new selected vertex.
17. Step 298: Need2(2) is assigned selected resource/register R1.
18. Step 300: Selected resource/register is R0.
19. Step 340: Candidate vertex set is {Need0(2), Need3(3), Need4(2)}.
20. Step 360: Need6(3) has been assigned R0, so Need0(2) and Need4(2) cannot be assigned R0. Candidate vertex set is {Need3(3)}.
21. Step 460: Need3(3) is the new selected vertex.
22. Step 298: Need3(3) is assigned selected resource/register R0.
23. Step 300: Selected resource/register is R1.
24. Step 340: Candidate vertex set is {Need7(2), Need8(2)}.
25. Step 360: Candidate vertex set is unchanged.
26. Step 390: Maximum weight of candidate vertices is 2. Candidate vertex set is unchanged.
27. Step 420: Maximum number of edges for candidate vertices is 4. Candidate vertex set is {Need7(2)}.
28. Step 460: Need7(2) is the new selected vertex.
29. Step 298: Need7(2) is assigned selected resource/register R1.
30. Step 300: Selected resource/register is R0.
31. Step 340: Candidate vertex set is {Need5(2), Need8(2)}.
32. Step 360: Need3(3) has been assigned R0, so Need8(2) cannot be assigned R0. Need6(3) has been assigned R0, so Need5(2) cannot be assigned R0. Candidate vertex set is empty.
33. Step 350: Candidate step was not originally set of all unassigned vertices in selected graph. Candidate set is {Need0(2), Need1(1), Need4(2), Need5(2), Need8(2)}.
34. Step 360: Need3(3) has been assigned R0, so Need8(2) cannot be assigned R0. Need6(3) has been assigned R0, so Need0(2), Need4(2), and Need5(2) cannot be assigned R0. Candidate vertex set is {Need1(1)}.
35. Step 460: Need1(1) is the new selected vertex.
36. Step 298: Need1(1) is assigned selected resource/register R0.
37. Step 300: Selected resource/register is R1.
38. Step 340: Candidate vertex set is {Need0(2)}.
39. Step 360: Need2(2) has been assigned R1, so Need0(2) cannot be assigned R1. Candidate vertex set is empty.
40. Step 350: Candidate step was not originally set of all unassigned vertices in selected graph. Candidate set is {Need0(2), Need4(2), Need5(2), Need8(2)}.
41. Step 360: Need2(2) has been assigned R1, so Need0(2), and Need4(2) cannot be assigned R1. Need7(2) has been assigned R1, so Need5(2) and Need8(2) cannot be assigned R1. Candidate vertex set is empty. There is no next vertex.
42. Step 302: Both selected resources/registers have not been tried. Selected resource/register is R0.
43. Step 340: Candidate vertex set is {Need0(2)}.
44. Step 360: Need6(3) has been assigned R0, so Need0(2) cannot be assigned R0. Candidate vertex set is empty.
45. Step 350: Candidate step was not originally set of all unassigned vertices in selected graph. Candidate set is {Need0(2), Need4(2), Need5(2), Need8(2)}.
46. Step 360: Need6(3) has been assigned R0, so Need0(2), Need4(2), and Need5(2) cannot be assigned R0. Need3(3) has been assigned R0, so Need8(2) cannot be assigned R0. Candidate vertex set is empty. There is no next vertex.
47. Step 302: Both resource/register values have been tried, without finding a next vertex. This resource/register pair is exhausted, for this graph.
48. Step 270: Need1(1), Need2(2), Need3(3), Need6(3), and Need7(2) are removed from graph 310. Graph 310 is still treated as a single graph.
49. Step 272: Only possible graph was graph 310, there is no next graph to allocate resource/register pair {R0, R1} to.
50. Step 274: Graph 310 is examined to determine if it is now more than one graph. Graphs 320 and 322 are found.
51. Step 262: Selected resource/register pair is {R2, R3}.
52. Step 266: Selected graph is 320.
53. Step 292: Selected resource/register is R2.

54. Step 350: Candidate vertex set is {Need0(2), Need4(2), Need5(2)}.
55. Step 360: Candidate vertex set is unchanged.
56. Step 390: Maximum weight of candidate vertices is 2. Candidate vertex set is unchanged.
57. Step 420: Maximum number of edges for candidate vertices is 2. Candidate vertex set is {Need4(2)}.
58. Step 460: Need4(2) is the new selected vertex.
59. Step 298: Need4(2) is assigned selected resource/register R2.
60. Step 300: Selected resource/register is R3.
61. Step 340: Candidate vertex set is {Need0(2), Need5(2)}.
62. Step 360: Candidate vertex set is unchanged.
63. Step 390: Maximum weight of candidate vertices is 2. Candidate vertex set is unchanged.
64. Step 420: Maximum number of edges for candidate vertices is 1. Candidate vertex set is unchanged.
65. Step 450: Candidate vertex set is arbitrarily set to {Need0(2)}.
66. Step 460: Need0(2) is the new selected vertex.
67. Step 298: Need0(2) is assigned selected resource/register R3.
68. Step 300: Selected resource/register is R2.
69. Step 340: Candidate vertex set is empty.
70. Step 360: Candidate vertex set is unchanged.
71. Step 350: Candidate step was not originally set of all unassigned vertices in selected graph. Candidate set is {Need5(2)}.
72. Step 360: Need4(2) has been assigned R2. Need5(2) cannot be assigned R2. Candidate vertex set is empty.
73. Step 302: Both selected resources/registers have not been tried. Selected resource/register is R3.
74. Step 340: Candidate vertex set is empty.
75. Step 360: Candidate vertex set is unchanged.
76. Step 350: Candidate step was not originally set of all unassigned vertices in selected graph. Candidate set is {Need5(2)}.
77. Step 360: Candidate vertex set is unchanged.
78. Step 460: Need5(2) is the new selected vertex.
79. Step 298: Need5(2) is assigned selected resource/register R3.
80. Step 300: Selected resource/register is R2.
81. Step 340: Candidate vertex set is empty.
82. Step 360: Candidate vertex set is unchanged.
83. Step 350: Candidate step was not originally set of all unassigned vertices in selected graph. Candidate set is empty.
84. Step 360: Candidate vertex set is unchanged. There is no candidate vertex.
85. Step 302: Both selected resources/registers have not been tried. Selected resource/register is R3.
86. Step 340: Candidate vertex set is empty.
87. Step 360: Candidate vertex set is unchanged.
88. Step 350: Candidate step was not originally set of all unassigned vertices in selected graph. Candidate set is empty.
89. Step 360: Candidate vertex set is unchanged. There is no candidate vertex.
90. Step 302: Both resource/register values have been tried, without finding a next vertex. This resource/register pair is exhausted, for this graph.
91. Step 270: Need0(2), Need4(2), and Need5(2) are removed from graph 320. Graph 320 is still treated as a single graph.
92. Step 272: Unprocessed graph 322 becomes the selected graph.
93. Step 268: Need8(2) is assigned resource/register R2.
94. Step 270: Need8(2) is removed from graph 322. Graph 322 is still treated as a single graph.
95. Step 274: There were no more separate graphs. The remains of graphs 320 and 322 are examined to find any remaining graphs. There are none. All resource-needs/variables have been assigned to resources.

Thus, using the methods 250, 260, 290 and 325 resources are automatically assigned to resource-needs based upon the most active resources. This assignment of resources to the most active resource-needs mimics the method that a programmer would commonly use for manually assigning resources. Consequently, the methods 250, 260, 290 and 325 assign resources in a manner that is understandable to a programmer. Moreover, if the resource assignment fails, the remaining resource-needs are those which are used less frequently. Furthermore, when resource assignment fails, the programmer is pointed to the point at which resource assignment failed and is given the opportunity to free resources. Because resources are assigned based upon their use, when resource assignment fails, the programmer only frees resources which are relatively infrequently used.

A method and system has been disclosed for globally assigning resources using an assembler. Software written according to the present invention is to be stored in some form of computer-readable medium, such as memory, CD-ROM or transmitted over a network, and executed by a processor. Consequently, a computer-readable medium is intended to include a computer readable medium which may transmit a signal, for example, over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for assembling assembly language code using an assembler, the code including a plurality of code blocks, the plurality of code blocks having a plurality of resource-needs and the plurality of code blocks having a plurality of resources, the method comprising the steps of:
   recognizing a context, the plurality of resource-needs, and the plurality of resources;
   automatically assigning at least a portion of the plurality of resources based upon a context, the plurality of resources being defined and managed using a grammar, at least a portion of the plurality of resources being assigned by pairing members of the plurality of resources with the plurality of resource-needs such that no two contexts exist simultaneously at a run time using the same resource:
   writing an executable image to a computer-readable medium based on the assembly language code if all of the plurality of resources-needs have been assigned from the plurality of resources;
   if any of the plurality of resources cannot be automatically assigned to the plurality of resource-needs, automatically providing an indication, of which of the plurality of resource-needs does not have at least one of the plurality of resources assigned; and
   allowing a user to manually free at least a portion of the plurality of resources if all of the plurality of resource-needs have not been assigned, the portion of the plurality of resources being selectable by the user based upon the indication of which of the plurality of resource-needs does not have at least one of the plurality of resources assigned.

2. The method of claim 1 wherein the executable image creating further includes;

creating the executable image based on the assembly language code only if all of the plurality of resources-needs have been assigned from the plurality of resources.

3. A method for assembling assembly language code using an assembler, the code including a plurality of code blocks, the plurality of code blocks having a plurality of resource-needs and the plurality of code blocks having a plurality of resources, the method comprising the steps of:

providing a first grammar for specifying a context;

providing a second grammar for specifying a plurality of resource-needs associated with the context;

providing a third grammar for specifying a plurality of resources associated with the context;

providing a fourth grammar for resolving ambiguities in usage of indirect resources or indirect use of resource-needs within the context;

providing a fifth grammar for resolving ambiguities in indirect control flow changes within the context;

automatically assigning at least portion of the plurality of resources by pairing members of the plurality of resources with the plurality of resource-needs so a portion of the plurality of contexts that exist simultaneously at a run time do not use the same resource;

if any of the plurality of resources cannot be automatically assigned to the plurality of resource-needs, automatically providing an indication of which of the plurality of resource-needs does not have at least one of the plurality of the resources assigned;

allowing a user to free at least a portion of the plurality of resources if all of the plurality of resource-needs have not been assigned the portion of the plurality of resources being selectable by the user based upon the indication of which of the plurality of resource-needs does not have at least one of the plurality of resources assigned and writing an executable image to a computer-readable medium based on the assembly language code if all of the plurality of resource needs have been assigned from the plurality of resources.

4. The method of claim 3 further comprising the step of:
recognizing resource usage in the plurality of code blocks.

5. The method of claim 3 wherein the resource assignment step further includes the steps of:

making assignments using a resource assignment graph including a plurality of vertices and a plurality of edges connecting the plurality of vertices, each of the plurality of vertices corresponding to a use of a resource-need by a code block of the plurality of code blocks, each of the plurality of edges connecting a pair of the plurality of vertices representing concurrent resource-needs.

6. The method of claim 5 wherein the resource assignment step 4 further includes the steps of:

assigning a portion of the plurality of resources to the plurality of vertices in the resource assignment graph such that members of the plurality of vertices sharing a common edge use different resources.

7. The method of claim 6 wherein the assignment step further includes the steps of:

providing a weight for each of the plurality of vertices based upon a number of contexts the resource-need represented by the vertex is active in; and assigning resources to the plurality of vertices in an order based upon the weight of each of the plurality of vertices.

8. The method of claim 7 further comprising the step of;
if the any of the plurality of vertices in the resource assignment graph cannot be assigned resources, indicating which of the plurality of vertices cannot be assigned such that members of the plurality of vertices sharing a common edge use different resources.

9. The method of claim 3 further comprising;
creating an executable image based on the assembly language code only if all of the plurality of resources-needs have been assigned from the plurality of resources.

10. A computer-readable medium containing a program for processing assembly language code, the assembly language code including a plurality of code blocks, the plurality of code blocks using a plurality of resources having a plurality of resource-needs, the program further comprising instructions for:

utilizing a parser and lexer for reading the assembly language code, recognizing a context, recognizing declarations and usages of the plurality of resource-needs and recognizing declarations and usages of the plurality of resources;

using a resource manager for automatically assigning at least a portion of the plurality of resources based upon a context, the plurality of resources being defined and managed using a grammar, at least a portion of the plurality of resources being assigned by pairing members of the plurality of resources with the plurality of resource-needs such that no two contexts exist simultaneously at a run time using the same resource; if any of the plurality of resources cannot be automatically assigned to the plurality of resource-needs. automatically providing an indication of which of the plurality of resource-needs does not have at least one of the plurality of resources assigned;

allowing a user to manually free at least a portion of the plurality of resources if all of the plurality of resource-needs have not been assigned, the portion of the plurality of resources being selectable by the user based upon the indication of which the plurality of resource-needs does not have at least one of the plurality of sources assigned; and using a code generator to write an executable image to another computer-readable medium based on the code if the plurality of the resource-needs have been assigned.

11. The computer readable medium of claim 10 wherein the resource manager further includes assigning a portion of the plurality of resources by using a resource graph including a plurality of vertices and a plurality of edges connecting the plurality of vertices, each of the plurality of vertices corresponding to a use of a resource-need, each of the plurality of edges corresponding to a pair of concurrent resource-needs.

12. The computer-readable medium of claim 11 wherein the resource manager further using further includes assigning a portion of the plurality of resources to the plurality of vertices such that any of the plurality of vertices sharing a common edge are assigned different resources from the plurality of resources.

13. The computer-readable medium of claim 12 wherein the resource manager assigns resources from the plurality of resources to the plurality of vertices in the resource graph(s)

guided by a weight for each of the plurality of vertices based upon the number of contexts in which the resource-need represented by the vertex is present in.

14. The computer-readable medium of claim 13 wherein the resource manager further indicates which of the plurality of vertices cannot be assigned resources from the plurality of resources such that vertices sharing a common edge are assigned different resources from the plurality of resources.

15. The computer-readable medium of claim 10 wherein the code generator using further includes:
   using the code generator for generating the executable image based on the code only if all of the plurality of resources-needs have been assigned from the plurality of resources.

* * * * *